US012783808B2

(12) United States Patent
Reddy

(10) Patent No.: US 12,783,808 B2
(45) Date of Patent: Nov. 3, 2026

(54) DIGITAL ASSISTANT GENERATION VIA LARGE LANGUAGE MODELS

(71) Applicant: SAP SE, Walldorf (DE)

(72) Inventor: Srinivasa Byaiah Ramachandra Reddy, Bangalore (IN)

(73) Assignee: SAP SE, Walldorf (DE)

( * ) Notice: Subject to any disclaimer, the term of this patent is extended or adjusted under 35 U.S.C. 154(b) by 428 days.

(21) Appl. No.: 18/243,570

(22) Filed: Sep. 7, 2023

(65) Prior Publication Data

US 2025/0086394 A1 Mar. 13, 2025

(51) Int. Cl.

*G06F 16/335* (2019.01)
*G06F 40/279* (2020.01)
*G06F 40/30* (2020.01)
*G06F 40/40* (2020.01)
*G06N 20/00* (2019.01)

(52) U.S. Cl.

CPC ............ *G06F 40/30* (2020.01); *G06F 40/279* (2020.01); *G06F 40/40* (2020.01); *G06N 20/00* (2019.01)

(58) Field of Classification Search

CPC ........ G06F 40/40; G06F 40/20; G06F 16/335; G06F 40/284; G06F 16/3344; G06F 16/338; G06F 16/334; G06F 40/205; G06F 16/438; G06F 16/90335

See application file for complete search history.

(56) References Cited

U.S. PATENT DOCUMENTS

| | | | | |
|---|---|---|---|---|
| 11,676,044 | B1 * | 6/2023 | Mazza | G06N 5/043 706/11 |
| 12,130,848 | B1 * | 10/2024 | Koneru | G06F 40/40 |
| 12,456,020 | B1 * | 10/2025 | Mishra | G06F 40/40 |
| 2020/0238178 | A1 * | 7/2020 | Lin | A63F 13/67 |
| 2021/0081443 | A1 * | 3/2021 | Cannon | G06F 16/3331 |
| 2022/0343250 | A1 * | 10/2022 | Tremblay | G06F 3/0482 |
| 2023/0297887 | A1 * | 9/2023 | Gurgu | G06N 20/00 706/12 |
| 2024/0265041 | A1 * | 8/2024 | Rennie | G06N 20/00 |
| 2024/0330579 | A1 * | 10/2024 | Saxena | G06F 40/106 |
| 2024/0379096 | A1 * | 11/2024 | Bose | G10L 15/10 |
| 2024/0419706 | A1 * | 12/2024 | Gutierrez | G06F 40/166 |
| 2025/0005269 | A1 * | 1/2025 | Ahmed | G06F 40/186 |
| 2025/0036674 | A1 * | 1/2025 | Hanes | G06F 16/335 |
| 2025/0054493 | A1 * | 2/2025 | Weston | G06F 40/30 |

OTHER PUBLICATIONS

"Introduction," python.langchain.com, visited Jul. 21, 2023, 3 pages.

(Continued)

*Primary Examiner* — Olujimi A Adesanya

(74) *Attorney, Agent, or Firm* — Klarquist Sparkman, LLP

(57) ABSTRACT

Automated digital assistant generation can be implemented via large language models. Domain-specific documents can be loaded into a large language model that is then prompted to generate intents, entities, exemplar utterances, and the like. Such configuration components can then be assembled into a digital assistant definition that can then be deployed as a digital assistant for the domain in question. Skills can be aggregated so that the digital assistant can address the domain along with other domains, whether closely related or not.

19 Claims, 11 Drawing Sheets

(56) References Cited

OTHER PUBLICATIONS

"Model I/O," python.langchain.com, visited Jul. 21, 2023, 1 page.
"Prompt templates," python.langchain.com, visited Jul. 21, 2023, 4 pages.
"Language models," python.langchain.com, visited Jul. 21, 2023, 1 page.
"Swagger RESTful API Documentation Specification," swagger.io, visited Jul. 21, 2023, 26 pages.
"Prompt Engineering Guide," promptingguide.ai, visited Jul. 26, 2023, 2 pages.
"SAP SuccessFactors: Using the Digital Assistant," help.sap.com, version 1H 2023, Jul. 20, 2023, 32 pages.
"Integration with SAP S/4HANA and SAP S/4HANA Cloud," SAP Conversational AI Documentation, help.sap.com, Jun. 27, 2023, 36 pages.
"Configuring the Enterprise Edition," SAP Conversational AI Documentation, help.sap.com, Jul. 4, 2023, 36 pages.
"Key Features of SAP Conversational AI," SAP Conversational AI Documentation, help.sap.com, Nov. 15, 2021, 16 pages.
"Configuration Guide for SAP Conversational AI Web Client," SAP Conversational AI Documentation, help.sap.com, Feb. 24, 2022, 18 pages.
"Concepts of SAP Conversational AI," Sap Conversational AI Documentation, help.sap.com, Sep. 8, 2022, 334 pages.
"Using SAP Conversational AI with a Consumption-Based Pricing Model," SAP Conversational AI Documentation, help.sap.com, Nov. 15, 2021, 6 pages.

* cited by examiner

```
v  my_first_assistant
  v my_first_capability
    v dataset
      v entities
        ! sample_entity.yaml
        ! status.yaml
      v intents
        ! sample_intent.yaml
    v dialog
      v nodes
        ! sample_node.yaml
       ! dialog-tree.yaml
    ! capability-config.yaml
  ! config.yaml

i README.md
```

600

FIG. 6

```
assistant_version: 1.0.0
skills:
 - skill:
   id: getOrderById
   condition: '#getOrder_intent"
   response:
    messages:
     - type: text
     content: "{{$Order}}"


intents:
 - intent:
   id: getOrder_intent
   examples:
     - get order details
     - show order details
     - check order details
     - find the order
     - details of an order

entities:
 - entity:
   id: orderId
   fuzzy_matching: true
   values:
     - value: order_syntax
       type: long
```

700

FIG. 7

```
assistant_version: 1.0.0
skills:
 - skill:
  id: getOrderById
  condition: '#getOrder_intent"
  request:
   url: <server_url>/api/orders/{orderId}
   headers: "'Content-Type': 'application/json'"
  response:
   messages:
   - type: raw
    content: "{{Orders.order.id}}, {{Orders.order.partner}},
{{Orders.order.amount}}"

- skill:
 id: searchOrders
 condition: '#searchOrder_intent"
 request:
   url: <server_url>/api/orders?name=${term}
   headers: "'Content-Type': 'application/json'"
 response:
   messages:
    - type: list
     content: "{{Orders.order.id}}, {{Orders.order.partner}},
{{Orders.order.amount}}"

intents:
- intent:
 id: getOrder_intent
 examples:
   - get order details
   - show order details
   - check order details
   - find the order using id
   - details of an order
- intent:
 id: searchOrders_intent
 examples:
   - search for order
   - find orders using partner name
   - get orders
   - list orders
entities:
 - entity:
   id: orderId
   fuzzy_matching: true
   values:
    - value: order_syntax
    type: long
 - entity:
 id: name
 fuzzy_matching: true
 values:
   - value: name_syntax
   type: string
```

800

FIG. 8

DIGITAL ASSISTANT GENERATION VIA LARGE LANGUAGE MODELS

FIELD

The field generally relates to automated generation of digital assistants with large language models.

BACKGROUND

Digital assistants can be of great value in the enterprise. However, conventional approaches require considerable time and effort to generate a digital assistant. Further, conventional approaches require specialized knowledge and experience on the part of the digital assistant developer.

Accordingly, there remains a need for improved generation of digital assistants.

BRIEF DESCRIPTION OF THE DRAWINGS

FIG. 6 is a block diagram of an example digital assistant definition.

FIG. 7 is a listing of an example digital assistant definition.

FIG. 8 is a listing of another example digital assistant definition.

DETAILED DESCRIPTION

Example 1—Overview

Figure 1:
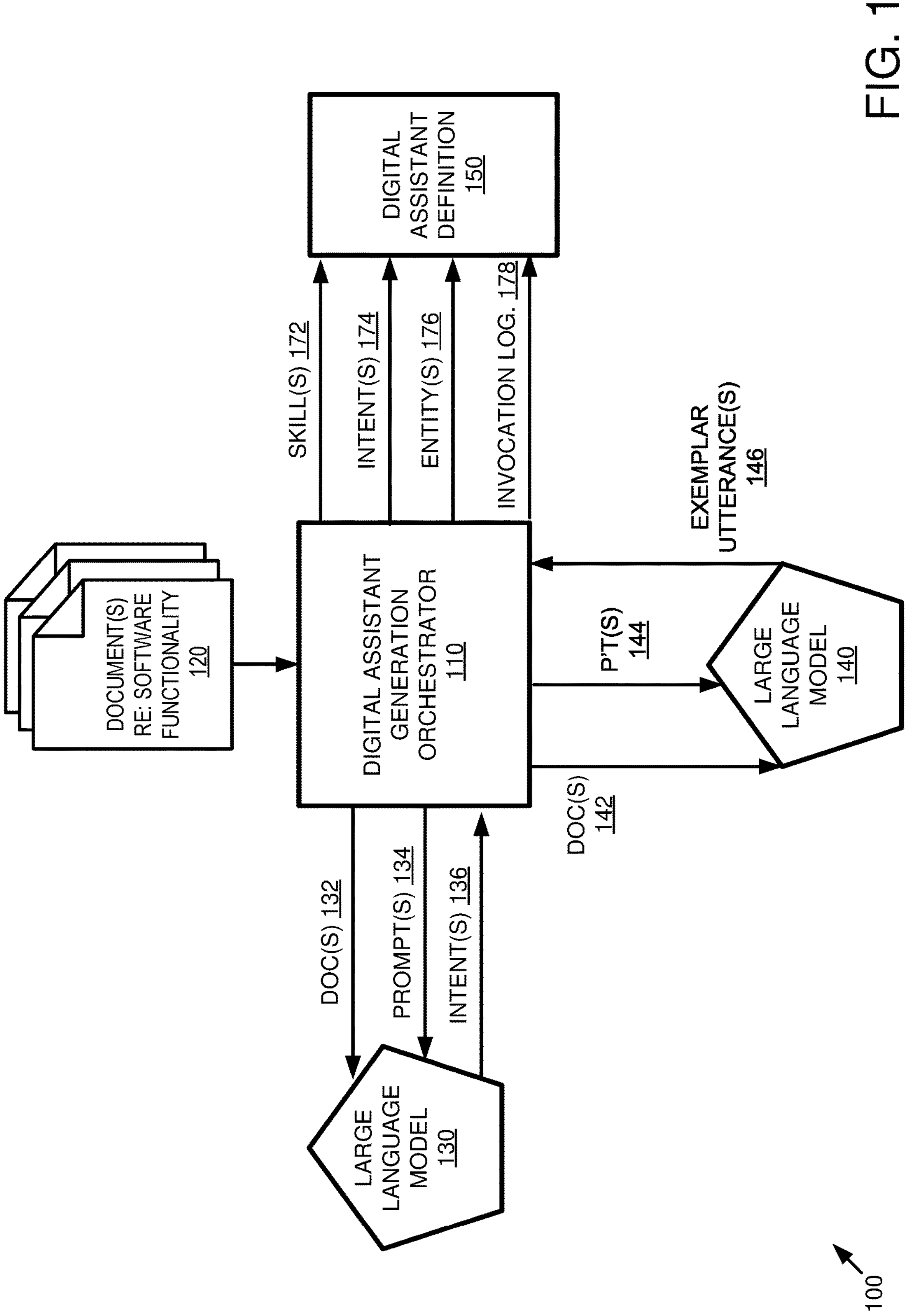
FIG. 1 is a block diagram of an example system implementing digital assistant generation via large language models.

Enterprise software applications may support a variety of enterprise workflows such as billing, invoicing, procurement, payroll, time and attendance management, recruiting and onboarding, learning and development, performance and compensation, workforce planning, and the like. In some cases, user interactions with an enterprise software application can be conducted via a conversation simulation application (e.g., a chatbot or the like). Accordingly, data processing functionality of the enterprise software application can be invoked using natural language commands, whether typed text or spoken utterances.

For example, a conversation simulation application can receive a natural language command invoking an enterprise workflow associated with an enterprise software application, such as assigning a source of supply within an enterprise resource planning (ERP) application that requires performing a sequence of steps. In another example, an enterprise resource planning system may include an issue tracking system configured to generate a ticket in response to an error reported via one or more telephone calls, emails, short messaging service (SMS) messages, social media posts, web chats, or the like.

Digital assistants can serve the role of interfacing with the user to provide a conversational user experience.

Although digital assistants can be quite helpful, the current approach to creating a digital assistant is a manual process performed by a specialized chatbot developer. Considerable time and cost are incurred to develop a single digital assistant. And, the effectiveness and efficiency of the digital assistant depends on skills, experience, and domain knowledge of the developer. Thus, skilled chatbot developers with domain knowledge are sought for high-quality digital assistants. The demand for such people is high, so the cost and time to develop increases.

Still additional time may be required to fine tune and deploy the digital assistant.

Instead, as described herein, large language models can be leveraged to generate a digital assistant. A digital assistant generation orchestrator service can load documents such as help documentation, API documentation, developer guide, user guide, and the like. The digital assistant generation orchestrator can pass the documents to a large language model to understand the application.

The digital assistant generation orchestrator can use prompting techniques to cause the large language models to generate user operations or intents (e.g., along with named entities). The ranking of intents can be determined by aggregating intents found in different input documents. Exemplar utterances, entities, and the like can also be generated as described herein.

A heterogeneous mix of large language model types can be supported so that more than one large language model is implemented as described herein.

Other techniques such as determining API invocation logic can be used as described herein.

The described technologies thus offer considerable improvements over conventional digital assistant development techniques.

Example 2—Example System Implementing Digital Assistant Generation Via Large Language Models FIG. 1 is a block diagram of an example system 100 implementing digital assistant generation via large language models that can be used in any of the examples herein. In the example, the system 100 includes a digital assistant generation orchestrator 110 that accepts one or more input documents 120 describing the functionality of a software application.

The orchestrator 110 is configured to load 132, 142 one or more large language models 130, 140 with the documents 120. Prompts 134 for extracting intents can then be sent to the large language model 130, which responds with intents 136. Although a single large language model 130 is shown as generating intents, in practice, one or more large language models 130 can be used by providing one or more documents to respective of the models 130. For example, a single large language model can be used to generate different sets of intents for different documents, different large language models can be used to generate intents for a same document, and the like. Intents can be aggregated as described herein.

The orchestrator 110 can also send prompts 144 to one or more large language models 140 to generate exemplar utterances 146. Such utterances can then be used to define intents, extract entities, or the like as described herein. As described herein, entities can appear within the utterances and be designated as such.

Thus, the digital assistant generation orchestrator 110 can be configured to accept a plurality of documents describing a suite of one or more software applications, submit at least one of the documents to at least one of the large language models as a learning document, prompt the at least one of the large language models for a list of intents, prioritize the intents, submit at least one of the intents as a given intent to one or more of the large language models, prompt the one or more of the large language models for a list of utterances, and output one or more digital assistant design-time artifacts comprising at least the given intent and one or more of the utterances.

The orchestrator 110 can be further configured to accept a document describing an API of the suite, submit the document to one or more of the large language models 130, 140, prompt the at least one of the large language models for a list of intents, and aggregate the intents of the document describing the API with other intents (that are sourced from other documents).

Although shown as separate, the models 130 can overlap with the models 140. Also, the models may be of different types. For example, one model may be tailored to one type of document (e.g., process diagram), while another is tailored to another type of document (e.g., API definition). In practice, connectors can be placed in front of the large language model so that the input document is converted to natural language.

Based on the information provided by the large language models 130, 140, including digital assistant design-time artifact configuration components (e.g., skills 172, intents 174, entities 176, invocation logic 178, and the like) as described herein, the orchestrator 110 can generate a digital assistant definition 150 comprising one or more digital assistant design-time artifacts.

In practice, the orchestrator 110 can perform the methods described herein. Agents can be employed by the orchestrator 110 to perform various subtasks of the automated development process.

Although not shown, a compiler can be configured to compile the one or more digital assistant design-time artifacts into a runtime executable digital assistant.

Any of the systems herein, including the system 100, can comprise at least one hardware processor and at least one memory coupled to the at least one hardware processor.

In practice, the large language models 130, 140 can be implemented as stored internal representations of the models (e.g., in one or more non-transitory computer-readable media).

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, there can be additional models 130, 140, different configuration components, and the like. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the large language models 130, 140, definition 150, artifacts, and the like can be stored in one or more computer-readable storage media or computer-readable storage devices. The technologies described herein can be generic to the specifics of operating systems or hardware and can be applied in any variety of environments to take advantage of the described features.

Figure 2:
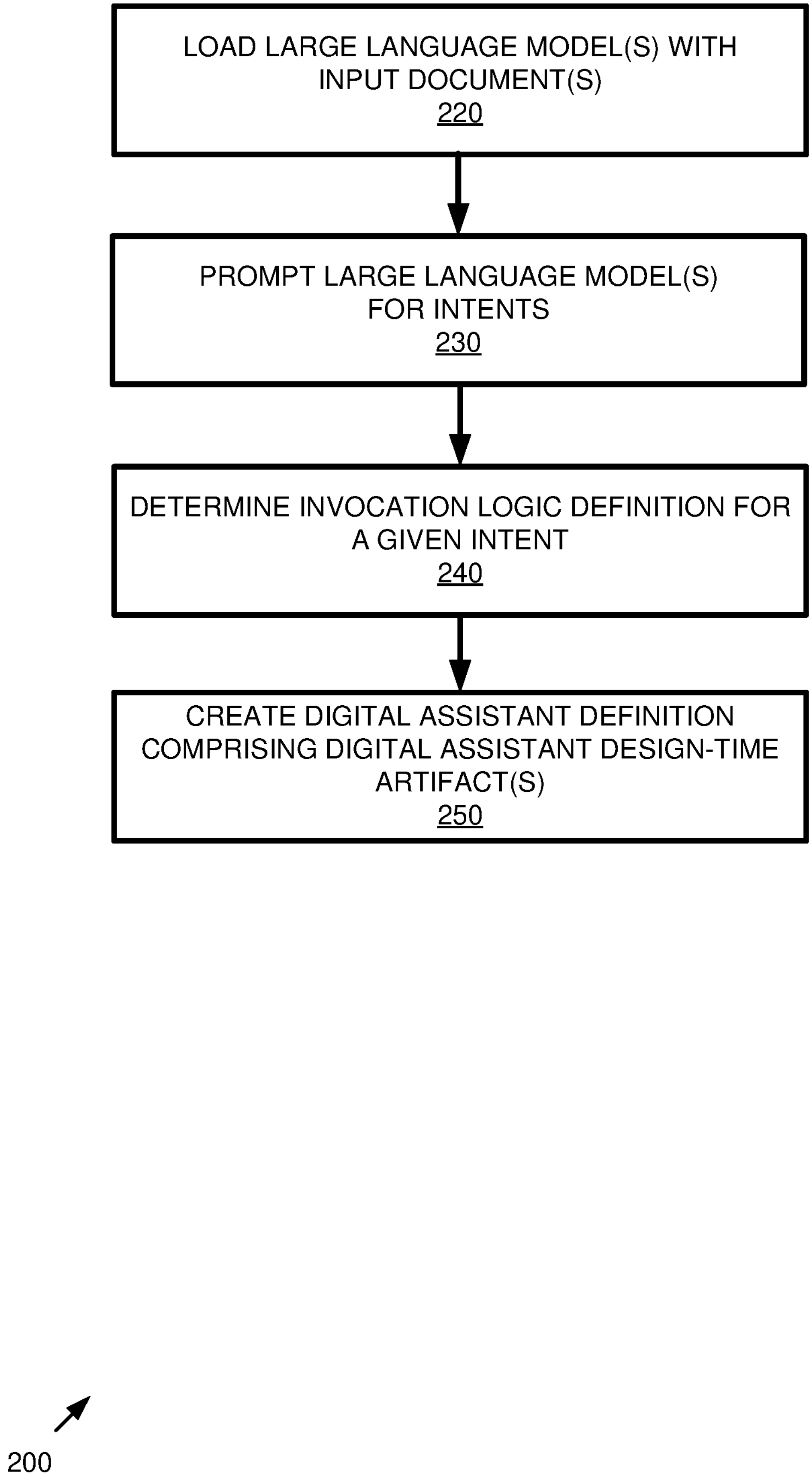
FIG. 2 is a flowchart of an example method of implementing digital assistant generation via large language models.

Example 3—Example Method of Digital Assistant Generation Via Large Language Models FIG. 2 is a flowchart of an example method 200 of implementing digital assistant generation via large language models and can be performed, for example, by the system of FIG. 1. The automated nature of the method 200 can be used in a variety of situations such as constructing a single digital assistant, constructing an array of digital assistants, creating skills for use in a unified digital assistant, or the like.

In the example, at 220, one or more large language models are loaded with one or more input documents describing the functionality of a software application. Such documents are sometimes called "learning documents."

At 230, at least one of the large language models is prompted to provide a list of possible intents that can be performed by users in the software application. Intents can be aggregated as described herein.

At 240, an invocation language logic definition for a given intent out of the intents is determined.

At 250, a digital assistant definition comprising digital assistant design-time artifacts is created. The given intent and the invocation logic definition for the given intent can be integrated as linked in the digital assistant definition. Linking can be provided by specifying a skill or intent and linking the invocation language logic definition to the skill or intent (e.g., by placing the logic definition in a definition of the skill or intent or by linking a skill to an intent that has the logic definition, or the like).

The resulting components such as artifacts can be assembled together as described herein. Further, API invocation logic can be determined and created as described herein.

Subsequently, a digital assistant can be deployed according to the digital assistant definition. User prompts can be received with the digital assistant, and answers to the user prompts can be output with the digital assistant.

As described herein, the top intents can be determined by aggregating lists of possible intents from different source documents. The given intent can be selected from the top intents. The process can iterate over the remaining top intents.

Prompting can also be performed to generate exemplar utterances. For example, for a given intent out of the possible intents, at least one of the one or more large language models can be prompted to generate a plurality of exemplar intent utterances that users would provide as prompts to perform the given intent. The utterances can be integrated into the digital assistant definition. For example, integrating the utterances can comprise integrating the utterances into the intents digital assistant design-time artifact (e.g., as exemplar utterances for a given intent).

Prompting can also be performed to identify entities. For example, at least one of the one or more large language models can be prompted to identify one or more entities in the utterances. Such entities can be integrated into the digital assistant definition. For example, if the digital assistant design-time artifacts comprise an entities digital assistant design-time artifact, integrating the entities into the digital assistant definition can comprise integrating the entities into the entities digital assistant design-time artifact.

Creating the digital assistant definition can comprise creating an intents digital assistant design-time artifact comprising the given intent and creating a skills digital assistant design-time artifact comprising the invocation logic definition. Or, the invocation logic definition can be integrated into the intents digital assistant design-time artifact.

The input documents can describe functionality of a suite of software applications.

Determining an invocation logic definition for a given intent can comprise converting an API definition into a natural language format, loading at least one of the large language models with the natural language format, and prompting the at least one of the large language models to generate the invocation logic definition for the given intent. Templates can be used as described herein.

Heterogenous large language model types can be supported. As described herein, at least one of the one or more large language models can be of a different large language model type. At least one model can be tailored to a document type that it receives. For example, some models may do better with code definitions than another model that does better with human language descriptions. Other models may perform well with images, such as being tailored to interpret process diagrams. Thus, a large language model can be loaded with input documents describing a process diagram of the software application.

The same large language model or a different large language model can be used when different processing is described as performed by a large language model. For example, there can be a first and second large language model performing the large language model processing. Or the same model can perform both processing tasks.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving a prompt can be described as sending a prompt depending on perspective.

Example 4—Example Software Application

In any of the examples herein, a software application (or "application") can take the form of a single application or a suite of a plurality of applications, whether offered as a service (SaaS), in the cloud, on premises, on a desktop, mobile device, wearable, or the like.

Example 5—Example Integration

In any of the examples herein, artificial intelligence capabilities can be provided to implement next generation conversational user experience. For example, a number of digital assistant skills can be integrated into a single digital assistant providing a uniform, seamless experience by users when interacting with an enterprise or other group. Thus, domain-specific language (e.g., applicable to a particular software application) can be integrated across a number of domains to provide a versatile digital assistant that can process utterances pertaining to any of a number of domains.

Digital assistants can be integrated into software providing useful help to users who wish to use any of a variety of software without having to engage in a learning curve. In any of the examples herein, a skill definition that is generated for a particular domain can be deployed and activated to a digital assistant that can handle multiple applications in different domains.

In some cases, processes such as "lead-to-cash" and "recruit-to-retire" may span multiple domains. Having a digital assistant that can span such domains allows a single digital assistant to serve throughout the process.

In other cases, a large number of skills may be required to support a single, complex product. Iteration can be performed to capture one or more skills to the digital assistant until a sufficient number are accumulated.

Example 6—Example Domains

In any of the examples herein, the domain can relate to specific business domains or functional areas. For example, a domain can focus on a particular aspect of business operations and offer a dedicated software solution to cater to the needs of the domain. Domains can include Enterprise Resource Planning (ERP) systems (e.g., finance, procurement, sales, manufacturing, supply chain management, and the like), Human Capital Management (e.g., employee management, payroll, talent acquisition, performance management, learning and development, and the like), customer experience (e.g., customer relationship management, marketing, sales, service, commerce, and the like), procurement and supply chain management (e.g., sourcing, procurement, supplier management, contract management, spend analysis, and the like), travel and expense management (e.g., booking, expense reporting, invoice processing, and the like), contingent workforce management and services procurement, intelligent asset management (e.g., asset management, maintenance, and field service), experience management solutions, analytics, and industry-specific domains such as retail, utilities, automotive, aerospace and defense, and the like. These are only examples, and many other domains can be supported.

Example 7—Example Large Language Models

In any of the examples herein, a large language model can take the form of an artificial intelligence model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

Example 8—Example Input Documents

In any of the examples herein, any of a variety of input documents can be used as input to a large language model as described herein. Input documents such as help portal documentation, API documentation, architecture and design documents, user guides, developer guides, programming guides, FAQs, data model documents, UML diagrams, and the like can be used. Images including sequence diagrams, process diagrams, and the like can be processed (e.g., to determine process steps) whether appearing in a document or as a document itself.

The term document is intended to cover files, web pages, or other collections of information. For example, a crawler can visit web pages, files can be loaded, or the like.

In practice, loading, filtering, pre-processing, and clean up can be supported. For example, an input document can be pre-processed by a connector that converts the input document to natural language to increase effectiveness and ability of the large language model to represent the input document. For example, an API document may be written as a Swagger document. A connector can translate the Swagger document into a natural language format, which is then input to the large language mode.

The input documents can be domain-specific documents that help the large language model generate skills, intents, and entities appropriate to the domain. Thus, in any of the examples herein, a domain-specific digital assistant can be generated via domain-specific input documents. However, the digital assistant can be enhanced to handle the domain-specific utterances with the domain-specific input documents while still handling utterance from other domains, whether closely related to the domain or not.

Example 9—Example Intents

In any of the examples herein, intents can be generated using large language models. In the context of digital assistant development, an intent represents the purpose or goal that a user wants to achieve through their interaction with the digital assistant. An intent can take the form of a label given to a class of input strings (e.g., utterances) that relate to a particular intent. For example, an intent to get order status can have the label getOrder_intent and identifies that an input string (e.g., during conversation with the digital assistant) is intended to get order status. Actual utterances can vary (e.g., "show order status," "get order details," "show order details," or the like).

As described herein, a large language model can generate possible intents based on input documents and aggregate the intents. In practice, a confirmation step can be included that comprises allowing a developer to review the identified intents and select the ones to keep or discard, if any.

Example 10—Example Utterances

In any of the examples herein, an utterance can be the natural language user input to the digital assistant. For example, users can interact with the digital assistant and access functionality by providing utterances to which the digital assistant responds with answers, by invoking functionality, or the like.

An utterance can be spoken, typed, or otherwise input. By interacting with digital assistants with natural language, users can achieve more and be immediately effective in accessing software functionality.

Example 11—Example Digital Assistant Design-Time Artifact Configuration Components In any of the examples herein, a digital assistant definition can comprise digital assistant design-time artifact configuration components. Such configuration components can comprise entities, intents, values, invocation logic, example utterances, and the like. In practice, the configuration components can be arranged within digital assistant design-time artifacts to define the various parts of the digital assistant.

Example 12—Example Digital Assistant Design-Time Artifact

In any of the examples herein, in a digital assistant definition can comprise digital design-time artifacts. Such artifacts are then consumed by a digital assistant compiler or interpreter that provides an executable or run-time digital assistant that can provide the actual digital assistant functionality. As described herein, such artifacts can include definitions of skills (also called "nodes"), intents, entities, and the like.

Different systems can handle the artifacts in different ways. For example, artifacts can be provided as files that define one or more instances of a skill, intent, entity, or the like. A framework for developing applications powered by language models can be used to assist with interacting with different (e.g., heterogeneous) language models via an abstraction layer, data connections to load documents, prompt templates, and the like. An example of such a framework is LangChain of LangChain, Inc. However, the technologies can be applied to other frameworks.

Example 13—Example Prompt Engineering Tools

In any of the examples herein, digital assistant prompt engineering tools can be used to generate prompts. Such tools can include LangChain, DIST, the OpenAI Python client, and the like.

Example 14—Example Prompts

In any of the examples herein, prompts can be provided to large language models to generate any of a variety of outputs that can be used to generate digital assistant design-time artifact configuration components as described herein. Prompts can be provided as a template, and a prompt template can be chosen based on document type. Such prompts can derive the information relevant to generating intents, entities, utterances, skills, and the like.

For example, prompts can be used to load documents, generate intents, generate exemplar utterances, generate entities, and the like. When generating intents, the prompt can specify generation of intents related to processing activities performed by the application, such as by specifying a processing domain of the application (e.g., "What are the possible intents that users can perform to develop or build a bot in SAP Conversational AI," "What are the possible intents that users can perform to process orders in <Product X>," or the like).

Because the large language model is loaded with documents that provide appropriate context for the digital assistant domain at issue, the large language model tailors outputs to the domain. Thus, if documents about software that tracks orders are loaded, intents, utterances, and entities related to checking on the status of an order are generated.

Thus, the monumental task of learning a particular domain can be handled by the large language model, which can accept input domain-related documents of considerable length, completely integrate such documents, and provide the digital assistant design-time artifact configuration components appropriate for building a digital assistant for the particular domain.

Prompts can include examples to encourage the large language model to provide results in a desired format. A prompt can request that components be indicated as such (e.g., "with the entities covered in brackets").

Prompts for intents can be provided as full prompts, prompt templates, or the like. Such prompts can be crafted during design and subsequently improved as needed.

Prompts to generate an invocation logic definition can take the form of few-shot prompts such as those below that are used to train the model to perform the task of generating an invocation logic definition.

TABLE

| Example Few-Shot Prompt for API Invocation Generation (Get Order Details) |
|---|
| API Invocation for get order details using ID with spec URL: GET /api/orders/{orderId}<br>headers: '''Content-Type': 'application/json''' will result in the following yaml snippet<br>- skill:<br>  id: getOrderById<br>  condition: '#getOrder__intent"<br>  request:<br>    url: < server__url>/api/orders/{orderId}<br>    headers: '''Content-Type': 'application/json'''<br>  response:<br>    messages:<br>    - type: raw<br>      content: "{{Orders.order.id}}, {{Orders.order.partner}}, {{Orders.order.amount}}" |

TABLE

| Example Few-Shot Prompt for API Invocation Generation (Search Order Using Keyword) |
|---|
| API Invocation for search order using keyword with spec URL: POST /api/orders?name=${term} headers: '''Content-Type': 'application/json''' will result in the following yaml snippet<br>- skill:<br>  id: getOrderById<br>  condition: '#getOrder__intent"<br>  request:<br>    url: < server__url>/api/orders/{orderId}<br>    headers: '''Content-Type': 'application/json'''<br>  response:<br>    messages:<br>    - type: list<br>      content: "{{Orders.order.id}}, {{Orders.order.partner}}, {{Orders.order.amount}}" |

TABLE

| Example Few-Shot Prompt for API Invocation Generation (Delete Order Using Order ID) |
|---|
| API Invocation for delete order using order ID with spec URL: DELETE /api/orders/{orderId} headers: '''Content-Type': 'application/json''' will result in the following yaml snippet<br>... |

After training with the few-shot examples, a result can then be provided by the large language model based on examples. For example, the prompt "What would the API Invocation for 'Add new order' look like?" can generate the invocation logic definition for adding a new order.

As described herein, a mix of heterogeneous types of large language models can be employed. For example, one large language model type specifically works on help documentation, another large language model type works on API documentation, another could be applied to process diagrams, and so forth.

Example 15—Example Intent Aggregation

In any of the examples herein, intents can be aggregated across documents or across document groups to find the top intents. For example, intents can be ranked by querying and identifying overlap of skills or intents across several input documents. For example, if the API documentation includes "creating" a bot and the help documentation has a section on "creating a bot," then the digital assistant generation orchestrator can identify and store "creating a bot" as one of the important intents based on the overlap of intents generated by large language model processing (e.g., the same intent appears in intents for both documents). Various techniques can be used to select the top intents. For example, the top n intents can then be selected, those intents exceeding a threshold priority score can be selected, or the like.

Thus, aggregation can comprise determining overlap across input documents, ranking the intents, and selecting the top intents.

Example 16—Example Invocation Logic Definitions

Software application developers can expose functionality via an application programming interface (API). In any of the examples herein, an invocation logic definition (or simply "invocation logic") can be determined and incorporated into the digital assistant definition. For example, a skill or intent can specify what API is to be invoked and how to invoke it. An intent can be linked to the logic directly, or the intent can be linked to a skill. Thus, when a user provides an utterance that is identified as expressing the intent, the logic can be invoked to perform the task desired by the user.

As an example invocation logic definition, a Uniform Resource Locator (URL) can be specified. Request parameters, payload, or the like can be included. The parameters can be derived from the utterance. For example, the logic can be specified so that an entity is incorporated into the invocation logic definition. Thus, an utterance of "check order details for order 1234" can result in invocation of an API at an URL with the parameter "1234."

In practice, an invocation logic definition can be specified that serves as a template into which parameters can be added (e.g., url:<server_url>/api/orders/{OrderId}).

An API can be invoked via an endpoint URL, HTTP methods, or the like. Authentication, headers, handling responses, error handling, and the like can be incorporated as needed.

After the API invocation logic has formed a complete HTTP request, it can be sent as a request to an API server using standard HTTP methods such as GET, POST, and the like. The API server processes the request, executes the relevant API logic on the server side, and generates a response.

The response may be in a format (e.g., JSON) from which the relevant information is extracted, interpreted, or the like, and then incorporated into a response. In some cases, the response may be suitable for presentation to the user. The definition can include how to handle the response.

A simple call to an API can be supported. The response can be parsed and given in the conversation user interface of the digital assistant. More complex API calls can support parameters and more sophisticated response processing. For example, in the case of a list, buttons (e.g., or voice options) can be provided for items in the list to perform further processing (e.g., drilldown, delete, edit, or the like).

APIs can be seamlessly integrated into the digital assistant so that the user can access complex functionality without having to be aware of the API details.

API invocation logic definitions can be generated in a variety of ways. For example, platform-supported implicit API invocation can be used. The platform supports API invocation based on a design-time definition under the skills→request attribute in yaml. Such a definition can be generated by a large language model using few-shot prompting techniques (e.g., by providing invocation examples to the large language model) as described herein. The large language model can then be prompted to generate the skill for a newly identified API in the same format.

In few-shot prompting, a few examples of both inputs and outputs can be provided to the large language model as examples for how the large language model is to respond to future inputs (e.g., requests for API invocation logic). For example, several examples of API details paired with counterpart API invocation logic can be provided to a large language model as prompts, and the large language model then provides a correct response.

TABLE

Example API Invocation Logic

```
- skill:
    id: searchOrders
    condition: '#searchOrder__intent"
    request:
        url: <server__url>/api/orders?name=${term}
        headers: '''Content-Type': 'application/json'''
  response:
      messages:
        - type: list content: "{{Orders.order.id}}, {{Orders.order.partner}},
{{Orders.order.amount}}"
```

Thus, determining an invocation logic definition can comprise training the one or more large language models with examples of invocation logic definitions associated with respective intents and requesting the one or more large language models to generate the invocation logic definition for the given intent.

Another way of generating API invocation logic is with platform-supported API invocation using dialog functions (e.g., extension points). The large language model can be used to understand the API documentation (e.g., the Swagger specification, API descriptions, developer guide, or the like). Then, the APIs can be correlated with target business process intents. Then, a large language model such as Codex can be used to generate code (e.g., Python code) to invoke the APIs. The code is then created as a dialog function which is embedded in the design time artifact. The digital assistant platform can support function invocation and further invokes the code.

Thus, determining an invocation logic definition can comprise training the one or more large language models with documentation and requesting the one or more large language models to generate the invocation logic definition for the given intent.

In many cases, the API invocation logic definition can be constructed via an endpoint URL by which the API is accessible. Parameters can be added to the URL as needed. A template providing an endpoint URL and other information such as headers can be used, and such a template can be completed by the large language model, or by using information from the large language model. For example, a prompt, "What endpoint URL can be used to invoke <functionality>?" can be used on a large language model into which an API document has been loaded.

Example 17—Example Components

Figure 3:
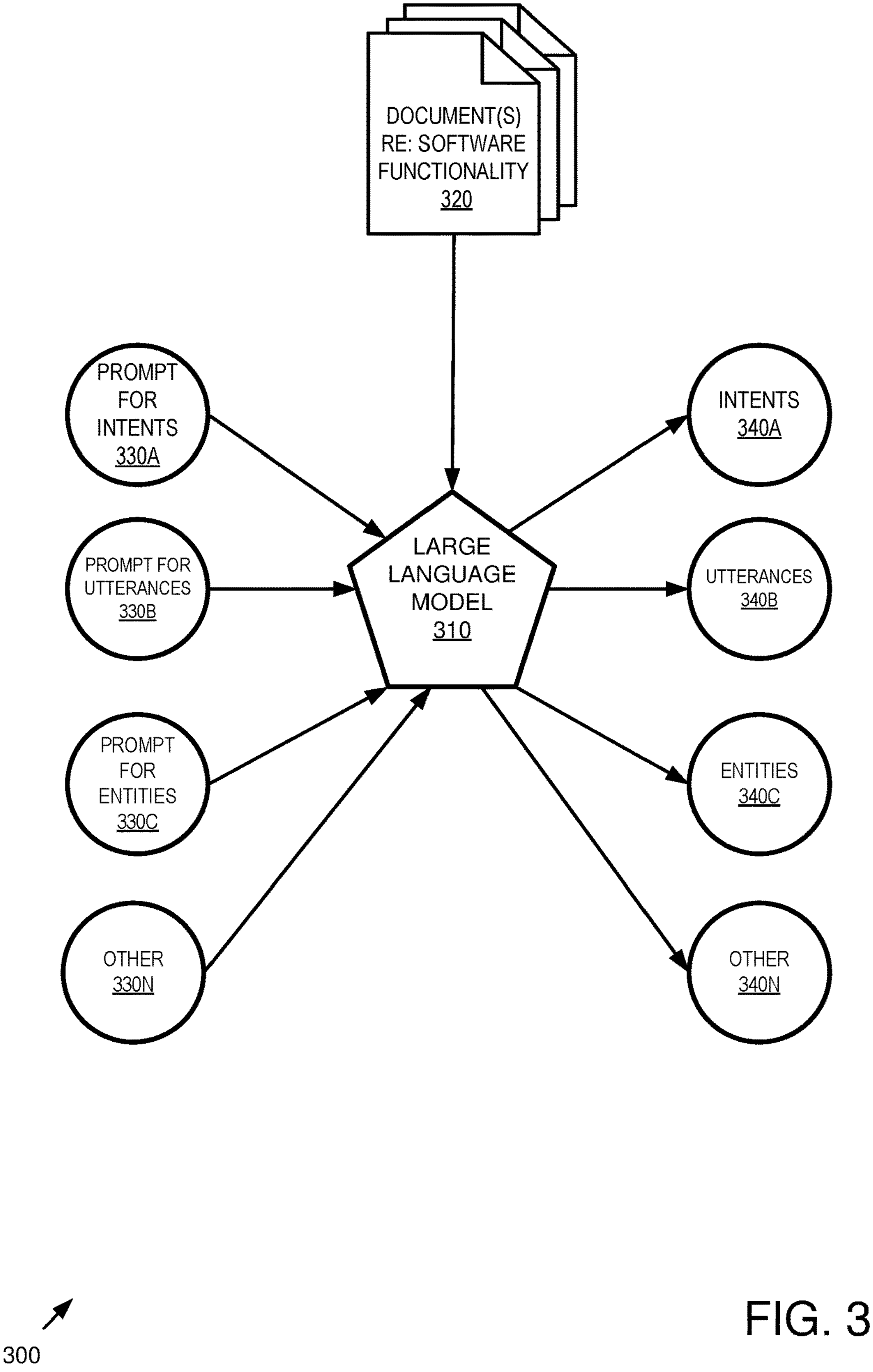
FIG. 3 is a block diagram showing components of an example system using a large language model to generate digital assistant design-time artifact configuration components.

FIG. 3 is a block diagram showing components of an example system 300 using one or more large language models to generate digital assistant design-time artifact configuration components that can be used in any of the examples herein. In the example, one or more large language models 310 are loaded with documents 320 describing the functionality of a software application.

Then, prompts 330A-N can be input to the one or more large language models 310, which output configuration components 340A-N. The order of prompts can matter (e.g., to establish intents, chain-of-thought prompting, or the like). For example, a prompt for intents 330A can generate intents 340A, the model can then be prompted 330B to generate utterances 340B for a given one of the intents 340A. The prompt for entities 330C can be incorporated into the prompt for utterances 330B, which indicates entities 340C in the utterances. Other prompts 330N are possible (e.g., to generate other configuration components 340N). For example, skills can be generated.

Also, loading of the documents 320 into the model 310 can be performed by prompting (e.g., "Learn this:" followed by the document text). Or, software can be used to load one or more of the documents 320 into the model 310 (e.g., for very large documents that are unwieldy to load via prompting).

Example 18—Example Assembly of Components

The resulting components such as artifacts can be assembled together using an assembler service implemented as a plugin or tool for the large language model. LangChain has agents and tools that can be used to assemble components, and a similar approach can be used. Prompting techniques can also be used for assembling components, such as instructing a large language model to organize artifacts into folders (e.g., "save intent files under intent folder and skill files under nodes folder" or the like). A compiler large language model plug in can be used to check whether the assembled design-time artifact has been generated with correct syntax.

Example 19—Example Detailed System Generating Digital Assistant Definition

Using the principles described herein, any number of different arrangements involving large language models can be used. In one example, both help manuals and an API definition document are used to generate intents. The intents can then be aggregated, and then utterances generated for such intents. A digital assistant definition can then be created from the generated configuration components.

Figure 4:
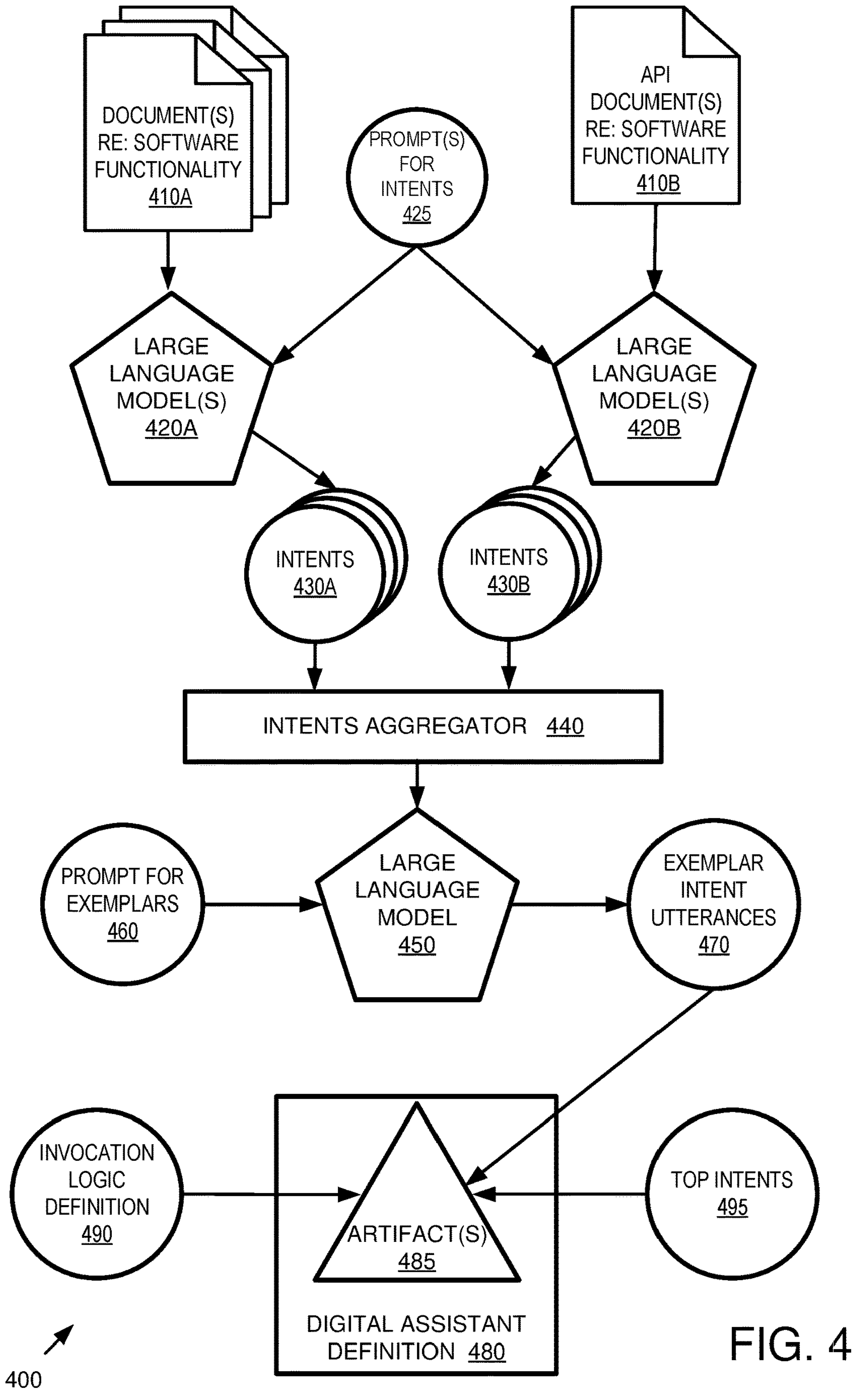
FIG. 4 is a block diagram showing an example system generating a digital assistant definition with one or more large language models.

FIG. 4 is a block diagram showing an example detailed system 400 generating a digital assistant definition with one or more large language models and can be used in any of the examples herein. In the example, one or more input documents describing functionality of a software application (e.g., help documentation such as a user guide or the like) 410A are loaded into one or more large language models 420A, and one or more documents 410B describing the API of the software application are loaded into one or more large language models 420B.

The large language models 420A, 420B are prompted for intents via one or more prompts 425 and generate intents 430A, 430B in response.

The intents aggregator 440 can aggregate the intents by finding overlap, number of occurrences, or the like. In practice, a plurality of documents 410A, 410B can be used to generate respective intents, and the intents occurring across the documents (or occurring across the most documents) can be considered to be the "top" intents via the aggregation process. Such intents are then passed to the large language model 450 (e.g., one at a time).

The model 450 can then be prompted for exemplar utterances to invoke a given intent via the prompt 460. The exemplar utterances 470 can then be used to construct design-time artifacts 485 within the digital assistant definition 480. As described herein, configuration components such as entities can be found in the utterances 470 (e.g., and designated as such therein).

Invocation logic definition 490 can be generated from the API documents 410B, whether by one or more large language models, templates, a combination, or the like. The logic definition 490 can be integrated into the definition 480 as described herein, and linked to an intent so that when an utterance indicating the intent is recognized by the digital assistant, it can trigger the logic defined by the definition 490 to carry out processing desired as indicated in the utterance.

The process can continue for the top intents 495.

In practice, intents can be grouped into skills so that a manageable granularity is supported. However, additional skills can be added so that the digital assistant supports a large number of intents. For example, different instances of input documents can be used to grow the number of skills, intents, or the like.

Example 20—Example Digital Assistant Definition

Figure 5:
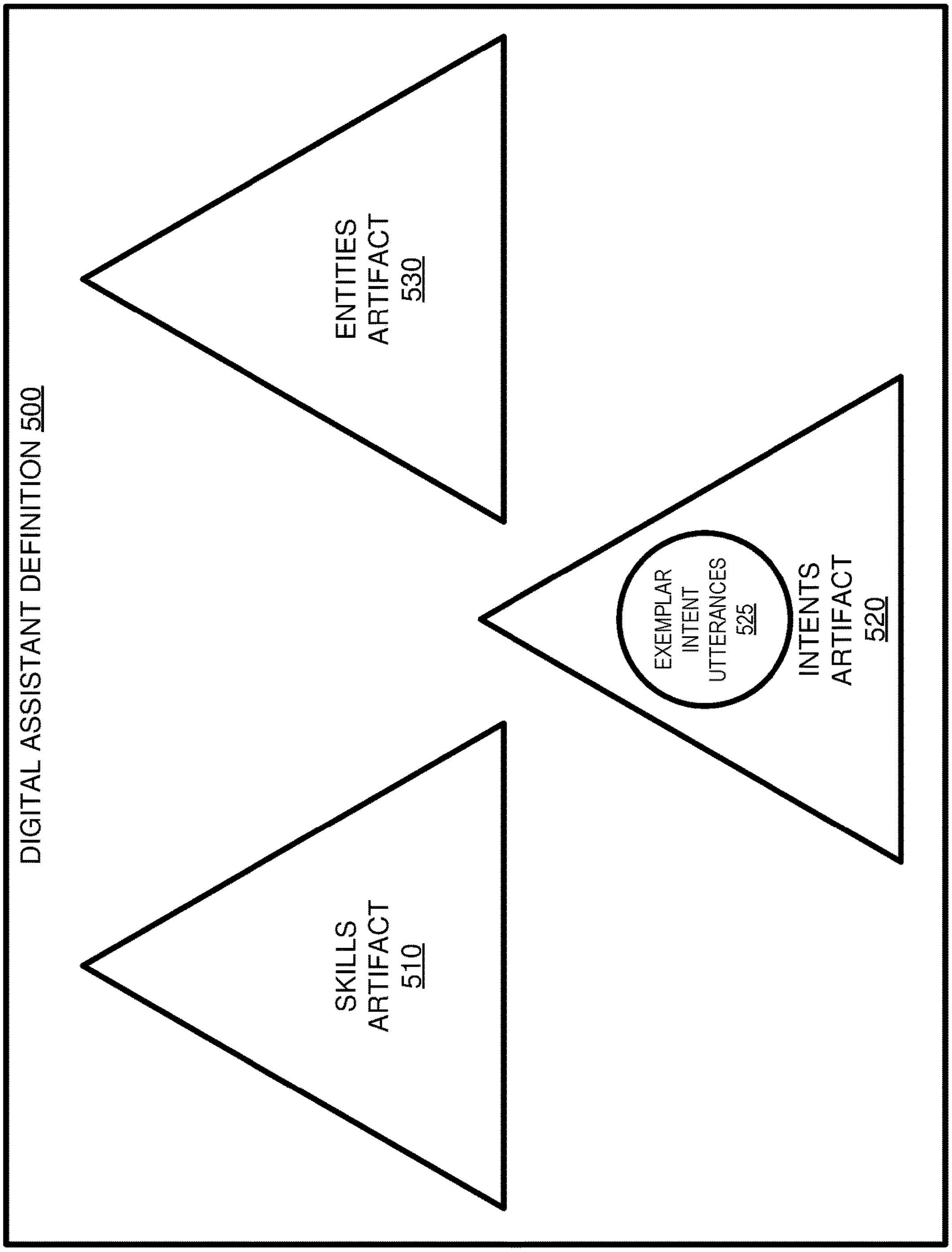
FIG. 5 is a block diagram of an example digital assistant definition comprising artifacts.

FIG. 5 is a block diagram of an example digital assistant definition 500 comprising artifacts that can be used in any of the examples herein. In the example, the definition 500 comprises a skills artifact 510, an intents artifact 520 comprising exemplar intent utterances 525, and an entities artifact 530.

The skills artifact 510 can define one or more skills of the digital assistant as described herein.

The intents artifact 520 can define one or more intents of the digital assistant as described herein.

The entities artifact 530 can define one or more entities of the digital assistant as described herein.

In practice, other entities, such as values or the like can be supported.

Example 21—Example Definition Block Diagram

A digital assistant suite can support a pro-code platform approach whereby a chatbot developer can follow a folder structure for dataset/entities, dataset/intents, and dialog/nodes (skills). Such folders can contain one or more files in a configuration-friendly format (e.g., yaml) that defines the behavior of the digital assistant.

FIG. 6 is a block diagram of a block diagram 600 of an example digital assistant definition that can be used in any of the examples herein. In the example, the assistant has defined capabilities that comprise a dataset. As shown, entities can be defined. In the example, definitions for configuration components such as entities can be defined via files (e.g., yaml in the example). Intents an also be defined similarly.

A dialog section of the definition comprises nodes (e.g., skills).

An example entities definition (e.g., dataset/entities) can be stored in the status.yaml file:

```
status.yaml
values:
- value: deployed
- value: running
```

An example intents definition (e.g., dataset/entities) can be stored in the sample_intent.yaml file:

```
sample__intent.yaml
examples:
- is my assistant [running](status)
- value: running
```

An example skill definition (e.g., dataset/node) can be stored in the sample_node.yaml file:

```
sample__node.yaml
type: node
title: node.default__title
condition: '#sample__intent'
response:
  messages:
  - type: text
  content: "You asked if your Digital Assistant is: @status"
finally:
  behavior: skip
```

Deployment can be achieved by deploying the digital assistant definition to a digital assistant suite platform as follows:

```
sapdas login --apiurl
"https://das-ibm-eval.sapdas-dev.sap.hana.ondemand.com"
  sapdas compile -o my__first__assistant__1.0.0.daar
  sapdas deploy -d my__first__assistant__1.0.0.daar -n i051432__handson
  -c
..\credentials.json
```

The example uses the SAP Digital Assistant Suite format. In practice, different formats of digital assistant platforms (e.g., Google DialogFlow, IBM Watson, Amazon Lex, or the like) can be implemented in any of the examples herein.

Example 22—Example Digital Assistant Definition Listing

FIG. 7 is a listing 700 of an example digital assistant definition (e.g., yaml file) that can be generated via the technologies described herein. In the example, a skill related to getting orders is supported. For example, the getOrder_intent intent can be invoked by utterances such as ("get order details," "show order details," and the like). The entity orderID is defined.

Example 23—Example Digital Assistant Definition Listing

FIG. 8 is a listing 800 of another example digital assistant definition (e.g., yaml file) that can be used in any of the examples herein. In the example, the skills getOrderById and searchOrders are defined. Invocation logic (e.g., specified by an URL with possible parameters) is included in the skills. An example invocation logic definition includes the following definition of a "request":

<server_url>/api/orders/{ordersId} headers: "'Content Type': 'application/json'"

The response is also defined.

Intents such as getOrder_intent and searchOrders_intent are defined.

Entities such as orderId and name are defined.

The resulting Digital Assistant can thus recognize utterances such as "get order details for 1223," invoke the getOrderById skill (which is explicitly linked to the getOrder_intent intent in the skills definition), and provide a result (e.g., the order details for order number 1223).

The resulting digital assistant can also recognize utterances such as "search for order," as being linked to the searchOrders_intent, invoke the searchOrders skill, and provide a result, which could be a single or multiple orders.

Example 24—Example Detailed Method

Figure 9:
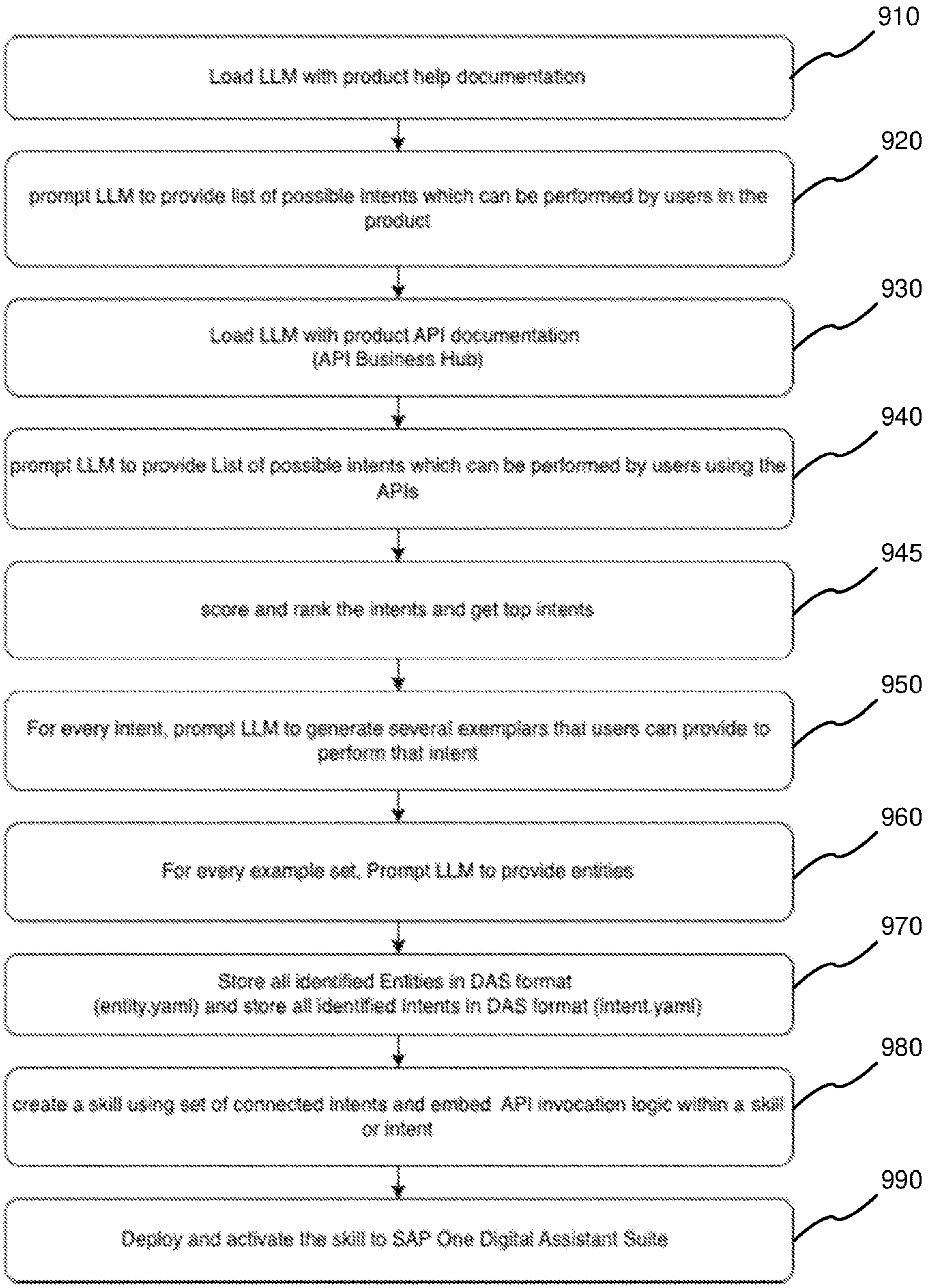
FIG. 9 is a flowchart of an example detailed method of implementing digital assistant generation via large language models.

FIG. 9 is a flowchart 900 of an example detailed method of implementing digital assistant generation via large language models that can be used in any of the examples herein. In the example, at 910, one or more large language models are loaded with product help documents. Such a product can be an application, suite of applications, or the like.

At 920, the large language model is prompted to provide a list of possible intents that can be performed by users in the product.

At 930, the large language model is loaded with product API documentation. In practice, such documentation can be available in a portal, whether public or private.

At 940, the large language model is prompted to provide a list of possible intents that can be performed by users using the APIs.

At 945, the intents from both 920 and 940 are scored and ranked. The top intents can then be chosen.

At 950, for a given intent, a large language model can be prompted to generate several exemplar utterances that users can provide to perform a given intent.

At 960, for a given example set, the large language model can be prompted to provide entities. As noted, such an action can be combined with providing utterances.

At 970, the identified entities are stored in a digital assistant suite format (e.g., yaml files) and the identified intents can be stored in the format.

At 980, a skill is created using a set of connected intents end API invocation logic is embedded within a skill or intent.

At 990, the skill is deployed and activated to the digital assistant suite.

Additional features can be incorporated as desired.

Example 25—Example Implementation: Conversational AI Digital Assistant

In one implementation, a digital assistant in the domain of conversational AI is generated. An example prompt to load relevant documents can take the following form:

Prompt No. 1: "Learn about the SAP conversational AI service using the help documentation available in the URL https:/help.sap.com/docs/conversational-ai and navigate to all the URLs from this main page."

The response can be as follows:

Sure, I can assist you with that. The SAP Conversational Al service (formerly known as Recast.Al) is an Al-powered chatbot platform that allows businesses to easily build and deploy conversational interfaces for various channels such as messaging apps, websites, and voice assistants.

To navigate to all the URLs available in the main page of the SAP Conversational Al service documentation, you can follow these steps:

1. Go to the URL httRs://helR.SaR.com/docs/conversational-ai.
2. On the left-hand side of the page, you will see a menu with several options. The first option is "Overview," which provides an introduction to the SAP Conversational Al service.
3. Clicking on "Getting Started" will take you to a page that explains how to create an account and start building your first bot.
4. The "Concepts" section provides more detailed information about the various components of a chatbot, such as intents, entities, and actions.
5. The "Building a Bot" section contains step-by-step tutorials that walk you through the process of creating a chatbot, starting from creating intents to deploying your bot on various channels.
6. "Channels" explains how to integrate your chatbot with various messaging platforms such as Facebook Messenger, Slack, and Telegram.
7. "Analytics" provides information on how to track and analyze the performance of your chatbot using the SAP Conversational Al analytics dashboard.
8. "API Reference" contains detailed information about the API endpoints available for the SAP Conversational Al service.
9. "FAQ" provides answers to . . . .

The next prompt can be to generate intents by using the following:

Prompt No. 2: "what are the possible intents which users can perform to develop or build a bot in SAP Conversational AI"

The response can be as follows:

When building a bot in SAP Conversational AI, there are several possible intents that users can perform to interact with the bot during the development and testing process. Here are some examples of possible intents:

1. Create a new bot—this intent can be used to create a new bot in SAP Conversational AI.
2. Update a bot—this intent can be used to update an existing bot in SAP Conversational AI.
3. Delete a bot—this intent can be used to delete a bot in SAP Conversational AI.
4. Train a bot—this intent can be used to train a bot's model using training data.
5. Test a bot—this intent can be used to test a bot's responses to user inputs.

6. View bot analytics—this intent can be used to view metrics and analytics for a bot, such as the number of users, messages, and user satisfaction.
7. Add or update intents—this intent can be used to add or update intents for a bot, such as creating new intents or updating existing ones.
8. Add or update entities—this intent can be used to add or update entities for a bot, such as creating new entities or updating existing ones.
9. Deploy a bot—this intent can be used to deploy a bot to a particular channel or platform, such as Facebook Messenger or Slack.

These are just a few examples of possible intents that can be used to develop or build a bot in SAP Conversational AI. The specific intents for your bot will depend on your use case and the specific needs of your bot's users.

The output can then be mined for the intents. Intents can be aggregated across documents or document sources to select the top intents as described herein.

The next prompt can be to load the large language model with API documents by using the following:

Prompt No. 3: "understand the APIs from https://api.sap-.com/package/SAPConversationalAI/rest"

The response can be as follows:

Certainly, I can help you understand the APIs available in the SAP Conversational AI package on the SAP API Business Hub.

The SAP Conversational Al package provides a set of REST APIs that allow developers to programmatically interact with the SAP Conversational AI service. These APIs can be used to manage bots, train models, analyze data, and integrate the service with other applications and systems. Here are some of the key APIs available in the SAP Conversational AI package:

1. Bots API—This API allows you to manage your bots, including creating new bots, updating existing bots, and deleting bots. You can also use this API to retrieve information about your bots, such as their status, versions, and training data.
2. Intents API—This API allows you to manage the intents of your bots, including creating new intents, updating existing intents, and deleting intents. You can also use this API to retrieve information about your intents, such as their expressions, entities, and actions.
3. Entities API—This API allows you to manage the entities of your bots, including creating new entities, updating existing entities, and deleting entities. You can also use this API to retrieve information about your entities, such as their values, synonyms, and examples.
4. Training API—This API allows you to train and test your bot's models, which are used to recognize user inputs and generate responses. You can use this API to upload training data, start and monitor training jobs, and evaluate the performance of your bot's models.
5. Analyze API—This API allows you to analyze the performance and usage of your bots, including metrics such as the number of messages received, the response time, and the user satisfaction. You can use this API to retrieve insights and trends about your bot's usage, and to optimize its performance based on these insights.

The next prompt can be to generate exemplar utterances and entities by using the following:

Prompt No. 4: "Show 20 examples (with the entities covered in brackets) of user requests when they want to create a new bot in SAP Conversational AI. Example: I'd like to create a new bot."

The response can be as follows:

Sure, here are 20 examples of user requests when they want to create a new bot in SAP Conversational AI, with the entities covered in brackets:

1. I want to create a bot for my [e-commerce website](industry).
2. Can you help me create a bot for my [customer service team](department)?
3. I'd like to create a bot that can answer [frequently asked questions](purpose).
4. I want to build a bot for my company's [internal communication](use case).
5. Can you assist me in creating a bot for [scheduling appointments](use case)?
6. I want to create a bot that can provide users with [product recommendations](use case).
7. Can you help me build a bot that can process [payments](use case)?
8. I need a bot that can help me track my [daily expenses](use case).
9. I'd like to create a bot that can [book flights](use case) for users.
10. I want to build a bot that can provide users with [weather information](use case).
11. Can you help me create a bot that can perform [translations](use case)?
12. I need a bot that can help me [manage my to-do list](use case).
13. I want to create a bot that can recommend [movies or TV shows](use case) to users.
14. Can you assist me in building a bot that can provide users with [news updates](use case)?
15. I need a bot that can help me track my [fitness goals](use case).
16. I'd like to create a bot that can help users find [nearby restaurants](use case).
17. Can you help me build a bot that can provide users with [legal advice](use case)?
18. I want to create a bot that can recommend [books](use case) to users based on their interests.
19. I need a bot that can help me [manage my inventory](use case).
20. I'd like to build a bot that can provide users with [personalized workout plans](use case)

The example utterances can be used to define intents in a digital assistant design-time artifact such to provide example utterances when defining the intents definition (e.g., for "CreateBot_Intent" intent). The entities can be extracted and defined as entities in a digital assistant design-time artifact defining entities.

Example 26—Example Implementations

Any of the following can be implemented.

Clause 1. A computer-implemented method comprising:

loading one or more large language models with one or more input documents describing functionality of a software application;

prompting at least one of the one or more large language models to provide a list of possible intents that can be performed by users in the software application;

determining an invocation logic definition for a given intent out of the list of possible intents; and creating a digital assistant definition comprising one or more digital assistant design-time artifacts, wherein the given intent and the invocation logic definition for the given intent are integrated as linked in the digital assistant definition.

Clause 2. The method of Clause 1, further comprising:

for the given intent out of the possible intents, prompting at least one of the one or more large language models to generate a plurality of exemplar intent utterances that users would provide as prompts to perform the given intent; and integrating the exemplar intent utterances into the digital assistant definition.

Clause 3. The method of Clause 2, further comprising:

prompting at least one of the one or more large language models to identify one or more entities in the exemplar intent utterances; and integrating the entities into the digital assistant definition.

Clause 4. The method of Clause 3, wherein:

the one or more digital assistant design-time artifacts comprise an entities digital assistant design-time artifact; and integrating the entities into the digital assistant definition comprises integrating the entities into the entities digital assistant design-time artifact.

Clause 5. The method of any one of Clauses 2-4, wherein:

integrating the exemplar intent utterances into the digital assistant definition comprises integrating the exemplar intent utterances into an intents digital assistant design-time artifact.

Clause 6. The method of any one of Clauses 1-5, wherein:

creating the digital assistant definition comprises:

creating an intents digital assistant design-time artifact comprising the given intent; and creating a skills digital assistant design-time artifact comprising the invocation logic definition.

Clause 7. The method of any one of Clauses 1-6, further comprising, wherein:

creating the digital assistant definition comprises:

creating an intents digital assistant design-time artifact comprising the given intent; and integrating the invocation logic definition in the intents digital assistant design-time artifact.

Clause 8. The method of any one of Clauses 1-7, wherein:

the input documents describe functionality of a suite of software applications.

Clause 9. The method of any one of Clauses 1-8, wherein:

determining an invocation logic definition for the given intent comprises:

converting an API definition into a natural language format;

loading at least one of the large language models with the natural language format; and prompting the at least one of the large language models to generate the invocation logic definition for the given intent.

Clause 10. The method of any one of Clauses 1-9, wherein:

determining an invocation logic definition for the given intent comprises:

converting an API definition into a natural language format; and generating the invocation logic definition for the given intent, wherein generating the invocation logic definition for the given intent comprises applying a template to the natural language format.

Clause 11. The method of any one of Clauses 1-10, further comprising:

determining top intents, wherein determining the top intents comprises aggregating lists of possible intents from different source documents; and selecting the given intent from the top intents.

Clause 12. The method of any one of Clauses 1-11, wherein:

at least one of the one or more large language models is of a different large language model type.

Clause 13. The method of Clause 12, wherein:

the at least one of the one or more large language models is tailored to a document type that it receives.

Clause 14. The method of Clause 12, wherein:

the at least one of the one or more large language models is tailored to interpret process diagrams.

Clause 15. The method of any one of Clauses 1-14, further comprising:

deploying a digital assistant according to the digital assistant definition;

receiving user prompts with the digital assistant; and outputting answers to the user prompts with the digital assistant.

Clause 16. The method of any one of Clauses 1-15, wherein:

determining an invocation logic definition comprises:

training the one or more large language models with examples of invocation logic definitions associated with respective intents; and requesting the one or more large language models to generate the invocation logic definition for the given intent.

Clause 17. A computing system comprising:

at least one hardware processor;

at least one memory coupled to the at least one hardware processor;

a stored internal representation of one or more large language models; and a digital assistant generation orchestrator configured to accept a plurality of documents describing a suite of one or more software applications, submit at least one of the documents to at least one of the large language models as a learning document, prompt the at least one of the large language models for a list of intents, prioritize the intents, submit at least one of the intents as a given intent to one or more of the large language models, prompt the one or more of the large language models for a list of utterances, and output one or more digital assistant design-time artifacts comprising at least the given intent and one or more of the utterances.

Clause 18. The system of Clause 17 wherein:

the digital assistant generation orchestrator is further configured to accept a document describing an API of the suite of one or more software applications, submit the document describing the API to one or more of the large language models, prompt the at least one of the large language models for a list of intents, and aggregate the intents of the document describing the API with other intents.

Clause 19. The system of any one of Clauses 17-18 further comprising:

a compiler configured to compile the one or more digital assistant design-time artifacts into a runtime executable digital assistant.

Clause 20. One or more non-transitory computer-readable media comprising computer-executable instructions that, when executed by a computing system, cause the computing system to perform a method comprising:

loading a first large language model with documentation of a software application;

prompting the first large language model to provide a list of possible intents that can be performed by users in the software application;

loading a second large language model with documentation of APIs of the software application;

prompting the second large language model to provide a list of possible intents that can be performed with the APIs of the software application;

identifying at least one given intent out of the lists of possible intents;

for the given intent, prompting a third large language model to generate a plurality of exemplar utterances that users could provide to perform the given intent, wherein the exemplar utterances comprise indications of entities;

storing the given intent in a design-time format for a digital assistant;

determining an API invocation logic definition for the given intent; and creating a digital assistant definition with the given intent, the API invocation logic definition, the exemplar utterances, and the entities.

Clause 21. One or more non-transitory computer-readable media comprising computer-executable instructions that, when executed by a computing system, cause the computing system to perform the method of any one of Clauses 1-16.

Example 27—Example Advantages

A number of advantages can be achieved via the technologies described herein. For example, due to the automated nature of the digital assistant generation, the reduction of digital assistant implement cost is quite significant.

Further, the time for digital assistant implementation and integration for standard scenarios can be reduced from months to minutes.

Further, the effectiveness and efficiency of the digital assistant can be maintained independent of the skills and experience of the chatbot developer controlling the development process.

Example 28—Example Computing Systems

Figure 10:
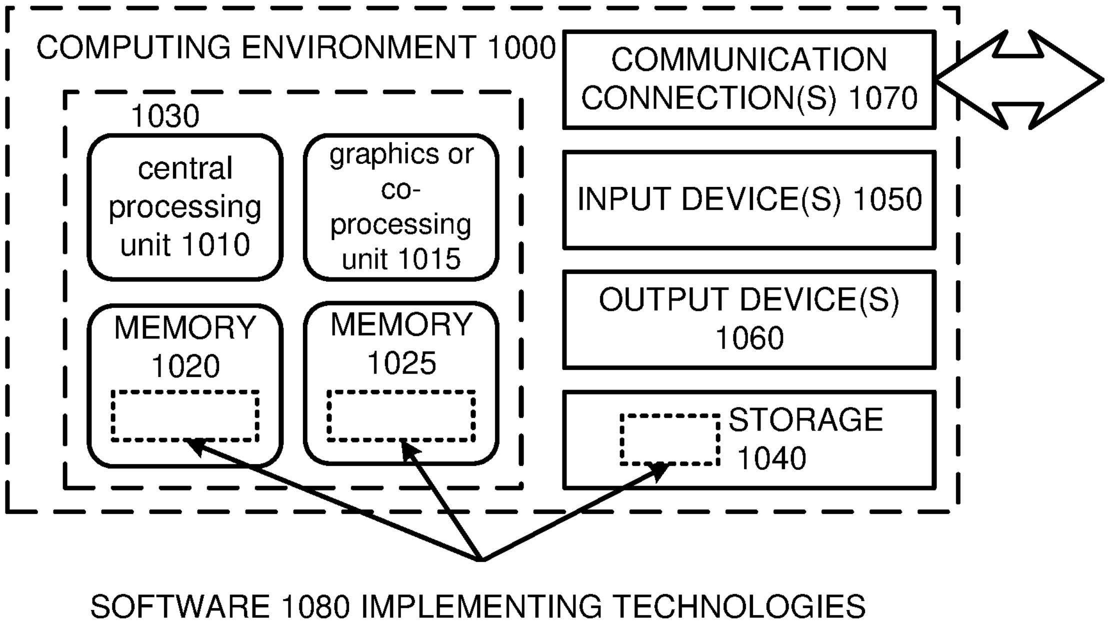
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 can have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 29—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 30—Example Cloud Computing Environment

Figure 11:
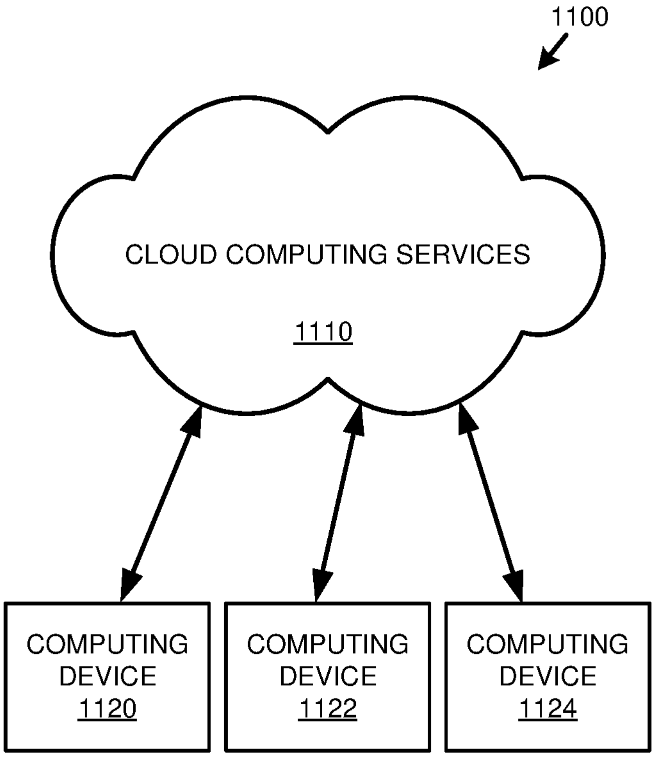
FIG. 11 is a block diagram of an example cloud computing environment that can be used in conjunction with the technologies described herein.

FIG. 11 depicts an example cloud computing environment 1100 in which the described technologies can be implemented, including, e.g., the system 100 of FIG. 1 and other systems herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example 31—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 32—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for automated generation of an executable digital assistant, the method comprising:

loading one or more large language models with a first source document describing functionality of a software application and a second source document describing one or more application programming interfaces of the software application;

prompting at least one of the one or more large language models to generate, based on the first source document, a first list of possible intents that can be performed by users in the software application and, based on the second source document, a second list of possible intents that can be performed using the one or more application programming interfaces;

determining top intents by aggregating the first list of possible intents and the second list of possible intents, wherein the aggregating comprises identifying overlap between possible intents from the first list of possible intents and possible intents from the second list of possible intents;

selecting a given intent from the top intents;

for the given intent, prompting at least one of the one or more large language models to generate a plurality of exemplar intent utterances that users would provide as prompts to perform the given intent;

prompting at least one of the one or more large language models to identify one or more entities in the plurality of exemplar intent utterances;

determining an invocation logic definition for the given intent; and creating a digital assistant definition comprising a plurality of separate digital assistant design-time artifacts, wherein the plurality of separate digital assistant design-time artifacts comprise a skills digital assistant design-time artifact, an intents digital assistant design-time artifact, and an entities digital assistant design-time artifact, wherein the given intent and the invocation logic definition for the given intent are integrated as linked in the digital assistant definition, wherein the intents digital assistant design-time artifact comprises an intent label and the plurality of exemplar intent utterances associated with the intent label, wherein the entities digital assistant design-time artifact comprises entity definitions for entities identified in the plurality of exemplar intent utterances, and wherein the skills digital assistant design-time artifact comprises a skill definition including a condition referencing the intent label and a request definition comprising the invocation logic definition, wherein the digital assistant definition is consumable by a digital assistant compiler or interpreter to generate the executable digital assistant.

2. The method of claim 1, further comprising:

integrating the exemplar intent utterances into the digital assistant definition.

3. The method of claim 2, further comprising:

integrating the entities into the digital assistant definition.

4. The method of claim 3, wherein:

integrating the entities into the digital assistant definition comprises integrating the entities into the entities digital assistant design-time artifact.

5. The method of claim 2, wherein:

integrating the exemplar intent utterances into the digital assistant definition comprises integrating the exemplar intent utterances into the intents digital assistant design-time artifact.

6. The method of claim 1, wherein:
creating the digital assistant definition comprises:
creating the intents digital assistant design-time artifact comprising the given intent; and
creating the skills digital assistant design-time artifact comprising the invocation logic definition.

7. The method of claim 1, wherein creating the digital assistant definition comprises:
creating the intents digital assistant design-time artifact comprising the given intent; and
integrating the invocation logic definition in the intents digital assistant design-time artifact.

8. The method of claim 1, wherein: the software application is included in a suite of software applications described by the first source document and the second source document.

9. The method of claim 1, wherein:
determining the invocation logic definition for the given intent comprises:
converting an application programming interface definition into a natural language format;
loading at least one of the large language models with the natural language format; and
prompting the at least one of the large language models to generate the invocation logic definition for the given intent.

10. The method of claim 1, wherein:
determining the invocation logic definition for the given intent comprises:
converting an application programming interface definition into a natural language format; and
generating the invocation logic definition for the given intent, wherein generating the invocation logic definition for the given intent comprises applying a template to the natural language format.

11. The method of claim 1, wherein:
the one or more large language models have at least two different large language model types.

12. The method of claim 11, wherein:
at least one of the one or more large language models is tailored to a document type that it receives.

13. The method of claim 11, wherein:
at least one of the one or more large language models is tailored to interpret process diagrams.

14. The method of claim 1, further comprising:
deploying a digital assistant according to the digital assistant definition;
receiving user prompts with the digital assistant; and
outputting answers to the user prompts with the digital assistant.

15. The method of claim 1, wherein:
determining the invocation logic definition comprises:
training the one or more large language models with examples of invocation logic definitions associated with respective intents; and
requesting the one or more large language models to generate the invocation logic definition for the given intent.

16. A computing system for automated generation of an executable digital assistant, the system comprising:
at least one hardware processor;
at least one memory coupled to the at least one hardware processor;
a stored internal representation of one or more large language models; and
a digital assistant generation orchestrator configured to accept a plurality of documents describing a suite of one or more software applications, submit the plurality of documents to at least one of the large language models as a learning document, prompt the at least one of the large language models for lists of possible intents, determine top intents by aggregating the lists of possible intents generated from different source documents of the plurality of documents, wherein the aggregating comprises identifying overlap among possible intents generated from the different source documents, select a given intent from the top intents and submit the given intent to one or more of the large language models, prompt the one or more of the large language models for a list of exemplar intent utterances, prompt at least one of the one or more large language models to identify one or more entities in the list of exemplar intent utterances, determine an invocation logic definition for the given intent, and output a digital assistant definition comprising a plurality of separate digital assistant design-time artifacts comprising at least the given intent and one or more of the exemplar intent utterances, wherein the plurality of separate digital assistant design-time artifacts comprise a skills digital assistant design-time artifact, an intents digital assistant design-time artifact, and an entities digital assistant design-time artifact, wherein the intents digital assistant design-time artifact comprises an intent label and the one or more exemplar intent utterances associated with the intent label, wherein the entities digital assistant design-time artifact comprises entity definitions for entities identified in the list of exemplar intent utterances, and wherein the skills digital assistant design-time artifact comprises a skill definition including a condition referencing the intent label and a request definition comprising the invocation logic definition, wherein the digital assistant definition is consumable by a digital assistant compiler or interpreter to generate the executable digital assistant.

17. The system of claim 16 wherein:
the plurality of documents comprises a document describing an application programming interface of the suite of one or more software applications, and wherein the lists of possible intents comprise a first list generated based on the document describing the application programming interface and a second list generated based on a different source document of the plurality of documents.

18. The system of claim 16 further comprising:
the digital assistant compiler configured to compile the plurality of separate digital assistant design-time artifacts into the executable digital assistant.

19. One or more non-transitory computer-readable media comprising computer-executable instructions that, when executed by a computing system, cause the computing system to perform a method for automated generation of an executable digital assistant, the method comprising:
loading a first large language model with documentation of a software application;
prompting the first large language model to provide a list of possible intents that can be performed by users in the software application;
loading a second large language model with documentation of application programming interfaces of the software application;
prompting the second large language model to provide a list of possible intents that can be performed with the application programming interfaces of the software application;

determining top intents by aggregating the lists of possible intents, wherein the aggregating comprises identifying overlap between possible intents from the list of possible intents provided by the first large language model and possible intents from the list of possible intents provided by the second large language model;

selecting a given intent from the top intents;

for the given intent, prompting a third large language model to generate a plurality of exemplar intent utterances that users could provide to perform the given intent, wherein the exemplar intent utterances comprise indications of entities;

storing the given intent in a design-time format for a digital assistant;

determining an application programming interface invocation logic definition for the given intent; and creating a digital assistant definition with the given intent, the application programming interface invocation logic definition, the exemplar intent utterances, and entities indicated in the exemplar intent utterances, wherein the digital assistant definition comprises a plurality of separate digital assistant design-time artifacts, and wherein the plurality of separate digital assistant design-time artifacts comprise a skills digital assistant design-time artifact, an intents digital assistant design-time artifact, and an entities digital assistant design-time artifact, wherein the intents digital assistant design-time artifact comprises an intent label and the exemplar intent utterances associated with the intent label, wherein the entities digital assistant design-time artifact comprises entity definitions for entities indicated in the exemplar intent utterances, and wherein the skills digital assistant design-time artifact comprises a skill definition including a condition referencing the intent label and a request definition comprising the application programming interface invocation logic definition, wherein the digital assistant definition is consumable by a digital assistant compiler or interpreter to generate the executable digital assistant.

* * * * *